United States Patent [19]

Jacobson

[11] Patent Number: 5,166,851

[45] Date of Patent: Nov. 24, 1992

[54] SELF-CONTAINED, MAILABLE AUDIO RECORDING AND REPRODUCING APPARATUS HAVING IN CERTAIN EMBODIMENTS A SPACE ADAPTED TO RECEIVE INDICIA

[76] Inventor: Eric C. Jacobson, 10714 Woodbine St., Los Angeles, Calif. 90034

[21] Appl. No.: 502,845

[22] Filed: Apr. 2, 1990

[51] Int. Cl.$^5$ .................. G11B 31/00; G11B 33/00
[52] U.S. Cl. ........................................ 360/137; 369/63
[58] Field of Search ............... 360/137, 1, 2; 369/68, 369/64, 63, 31; 340/569; 40/124.1, 455, 456, 457, 902, 906; 446/81, 397; 206/387, 307; 381/36; 395/2

[56] References Cited

U.S. PATENT DOCUMENTS

| | | | |
|---|---|---|---|
| 2,580,071 | 12/1951 | Bunyard | 369/68 |
| 3,000,638 | 9/1961 | Dennis | 369/63 |
| 3,184,241 | 5/1965 | Jones | 369/63 |
| 3,312,475 | 4/1967 | Mazuranic | 369/31 |
| 3,462,157 | 8/1969 | Barnett et al. | 369/68 |
| 3,641,684 | 2/1972 | Paige | 360/1 |
| 3,798,806 | 3/1974 | Sanford | 40/455 |
| 4,102,067 | 7/1978 | Tarrant | 40/455 |
| 4,348,700 | 9/1982 | Iovino | 360/60 |
| 4,433,780 | 2/1984 | Ellis | 206/387 |
| 4,525,821 | 6/1985 | Garcia | 369/63 |
| 4,607,747 | 8/1986 | Steiner | 40/455 |
| 4,636,881 | 1/1987 | Brefka et al. | 369/31 |
| 4,791,741 | 12/1988 | Kondo | 369/64 |
| 4,828,105 | 5/1989 | Silengo et al. | 206/387 |
| 4,878,871 | 11/1989 | Noto | 446/81 |
| 5,063,698 | 11/1991 | Johnson et al. | 40/455 |

FOREIGN PATENT DOCUMENTS 2052395  4/1972  Fed. Rep. of Germany ........ 369/68

*Primary Examiner*—John H. Wolff
*Assistant Examiner*—Craig A. Renner

[57] ABSTRACT

An "audio mailer," including a tape recorder or other sound recording and reproducing device non-removably encased and configured as a mailer, so that a user can conveniently and confidentially send or receive voice or other sound messages through the mail. The mailer may further have a crevice space for an inserted enclosure, such as a letter, document, photograph or other indicia. A customized or commercially available small tape recorder and audiotape sound storage medium may be employed in the preferred embodiment. The audiotape may be either built-in or contained in a removable microcassette. Duplicate removable audiotape microcassettes may be employed to enable a sender to simultaneously record a copy of a mailed audio message and preserve it for future reference. In an alternate embodiment, computer microchip-based sound recording and reproducing technology and storage medium may be employed. The non-removable casing for the recording and playback device and sound storage medium is made of durable cardboard or other durable lightweight material upon which an address and return address may be placed and postage affixed. The recorder's controls are positioned at the top of the casing opening and are fully concealed when the casing is sealed. After initial use, the audio mailer may be either preserved as a keepsake for repeat listening, or reused. The mailer in the preferred embodiment is approximately 3½" (width)×7½" (legnth)×⅞" (depth) in dimension, weighing approximately 6 ounces.

30 Claims, 2 Drawing Sheets

SELF-CONTAINED, MAILABLE AUDIO RECORDING AND REPRODUCING APPARATUS HAVING IN CERTAIN EMBODIMENTS A SPACE ADAPTED TO RECEIVE INDICIA

REFERENCES CITED

| DISCLOSURE DOCUMENT | | | |
|---|---|---|---|
| 189818 | 3/31/1988 | Eric C. Jacobson | |
| U.S. PAT. DOCUMENTS | | | |
| 2,580,071 | 12/1951 | Bunyard | 369/68X |
| 3,000,638 | 9/1961 | Dennis | 369/63X |
| 3,184,241 | 5/1965 | Jones | 369/63X |
| 3,312,475 | 4/1967 | Mazuranic | 369/31 |
| 3,462,157 | 8/1969 | Barnett et al | 369/68 |
| 4,525,821 | 6/1985 | Garcia | 369/31 |
| 4,636,881 | 1/1987 | Brefka et al | 369/31 |
| FOREIGN PATENT DOCUMENTS | | | |
| 2052395 | 4/1972 | West Germany | 369/68 |

BACKGROUND OF THE INVENTION

This invention relates to mailers and specifically to an apparatus "audio mailer" apparatus, including a tape recorder or other sound recording and reproducing device non-removably encased and configured as a mailer.

The object of this invention is to enable people to more conveniently send or receive voice or other sound messages through the mail or other forms of transit. It is currently a not uncommon practice for people to send one another individual cassette audiotapes through the mail, sometimes in rectangular cardboard mailers conforming to the size of a standard cassette audiotape. Encasing and configuring a small, inexpensive tape recorder or other sound recording and reproducing device as a mailer makes this practice more convenient by obviating the necessity for the sending or receiving party to locate a tape recorder unit and insert the audiotape cassette for recording or playback purposes.

The audio mailer is a new option among the arsenal of routine communicative methods and instruments such as written letters, telegrams, facsimile transmissions, telephone calls, answering machine messages, or separately conveyed audiotape cassettes. As such, it is designed with the requirements of inexpensive mass production and use, light weight and low retail and postal costs in mind. The invention is of general utility to those who find conveying a message through dictation a more personal and/or efficient alternative to (or addition to) written or typed communication, or a desirable substitute for a telephone call. It is of particular utility to specially situated individuals such as the non-or marginally literate, the physically disabled, or widely separated intimates without ready access to telephones (or requiring a less expensive alternative to calling), among others, for whom sending a verbal communication by mail is preferable to, and more practical than, other communicative forms. The audio mailer is also of potential use to certain individuals, such as musical artists, who regularly send others audio exemplars of their work product.

Tangentially hereto, as referenced above, audio devices have been previosly fashioned for mailing in the form of a postcard carrying a sound record [Mazuranic] and an audible greeting card [Barnett et al.], have been simply packaged in the form of a toy cardboard record player [von Ronn, W. Germany], and have been encased in the recess of a religious cross bearing an audiotape message [Garcia].

DESCRIPTION OF EMBODIMENTS OF THE INVENTION

The audio mailer is a mailer which in its preferred embodiment is designed for one time use as such, and thereafter may be either preserved as a keepsake for repeat listening by the recipient, or reused by taping over the original message. In this preferred embodiment the audio mailer is comprised of a small tape recorder device and built-in audiotape cassette of (or approximately of) "microcassette" size, and a surrounding casing, approximately $3\frac{1}{2}"$ (width)$\times 7\frac{1}{2}"$ (length)$\times \frac{3}{4}"$ (depth) in dimension and weighing approximately 6 ounces. A customized or commercially available small tape recorder device with standard control means including record, play, rewind, fast forward and (optionally) stop buttons, capable at a minimum of adequate, rudimentary recording and playback sound quality (comparable to that achieved via telephone), may be employed. Control buttons, speaker, microphone, and battery components are positioned at the opening of the casing for easy access. The device's electronic integrated circuitry is contained below the control buttons and components at the opening of the casing. The cassette in given audio mailer units may contain differing amounts of audiotape so that the time duration of a message may range from one minute and up (thus permitting the weight of—and postage for—the unit to be no higher than necessary for a user's particular communicative purpose). The tape recorder device and audiotape cassette are securely encased in durable cardboard or other durable lightweight material of rectangular dimension which is sealable and stampable, so as to be suitable in all respects for transit through the mail and other messenger, letter, and package delivery services, or direct personal conveyance. A crevice space is adapted for the optional insertion of an enclosure such as a letter, document, photograph or other indicia, with the audiotape communication.

Figure 1:
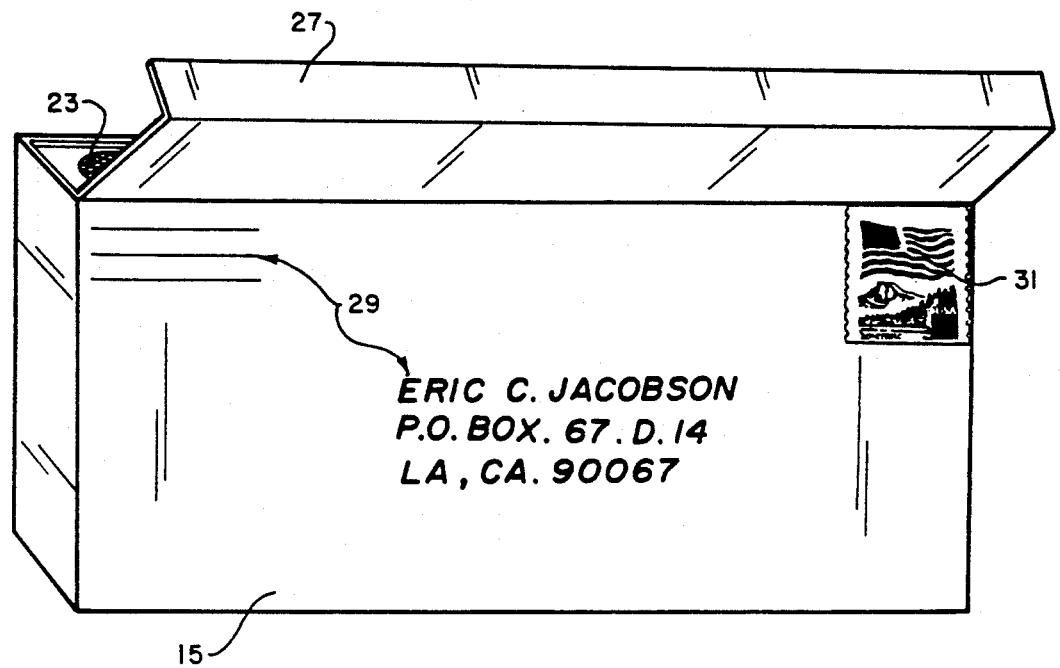
FIG. 1 is a perspective front view of a small tape recorder device encased and configured as a mailer, with open flap partially exposing a speaker.

Referring to the drawings and particularly to FIG. 1, a rectangular casing of cardboard 15 surrounds and securely, non-removably encases a tape recorder device, the speaker 23 of which is partially shown.

Figure 2:
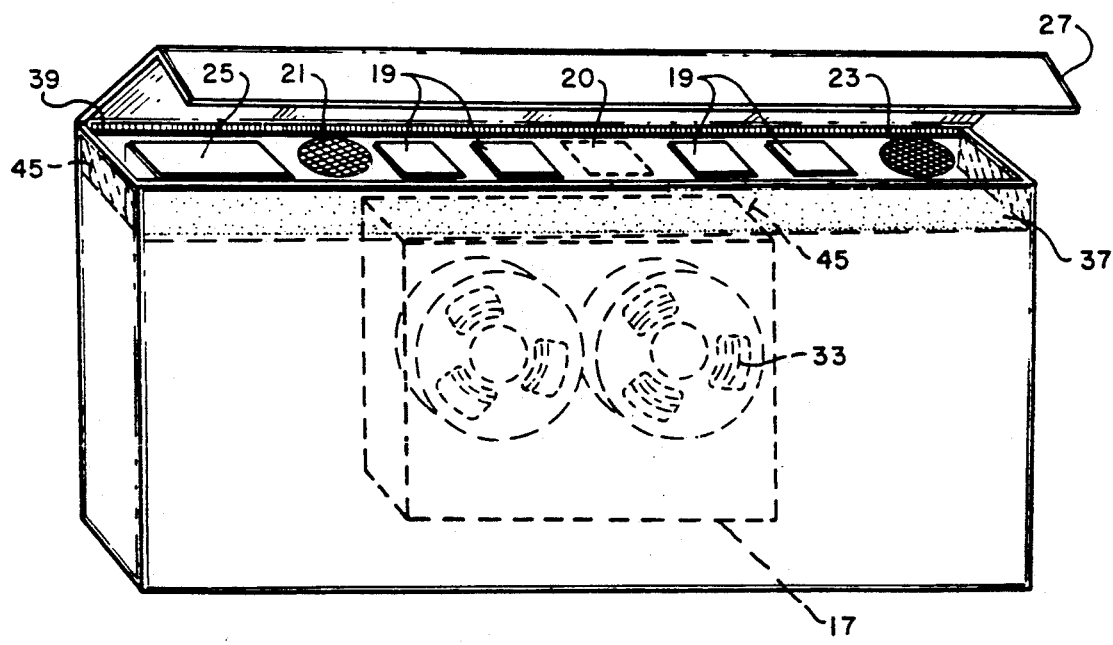
FIG. 2 is a perspective rear view of a small tape recorder device with built-in audiotape cassette encased and configured as a mailer, with open flap exposing speaker, control buttons, microphone, and battery.

Referring to FIG. 2, speaker 23, control buttons (record, play, rewind, fast forward) 19, microphone 21, and battery 25 are positioned for easy access by user at the opening of casing. An area for an optional stop button 20 is also shown. Tape recorder device electronic integrated circuitry 45 is positioned just below the control buttons and above the built-in audiotape cassette 17. The cassette 17 in a given audio letter unit may contain differing amounts of audiotape 33 so that the time duration of a message may range from one minute and up (thus permitting the weight of—and postage for—the mailer to be no higher than necessary for the user's particular communicative purpose). The sender bends back the casing flap 27 and records a voice or other sound communication by working the control buttons 19. Upon recording a message, the sender may cue the message for the recipient's immediate listening by further working the rewind and other control buttons.

Figure 3:
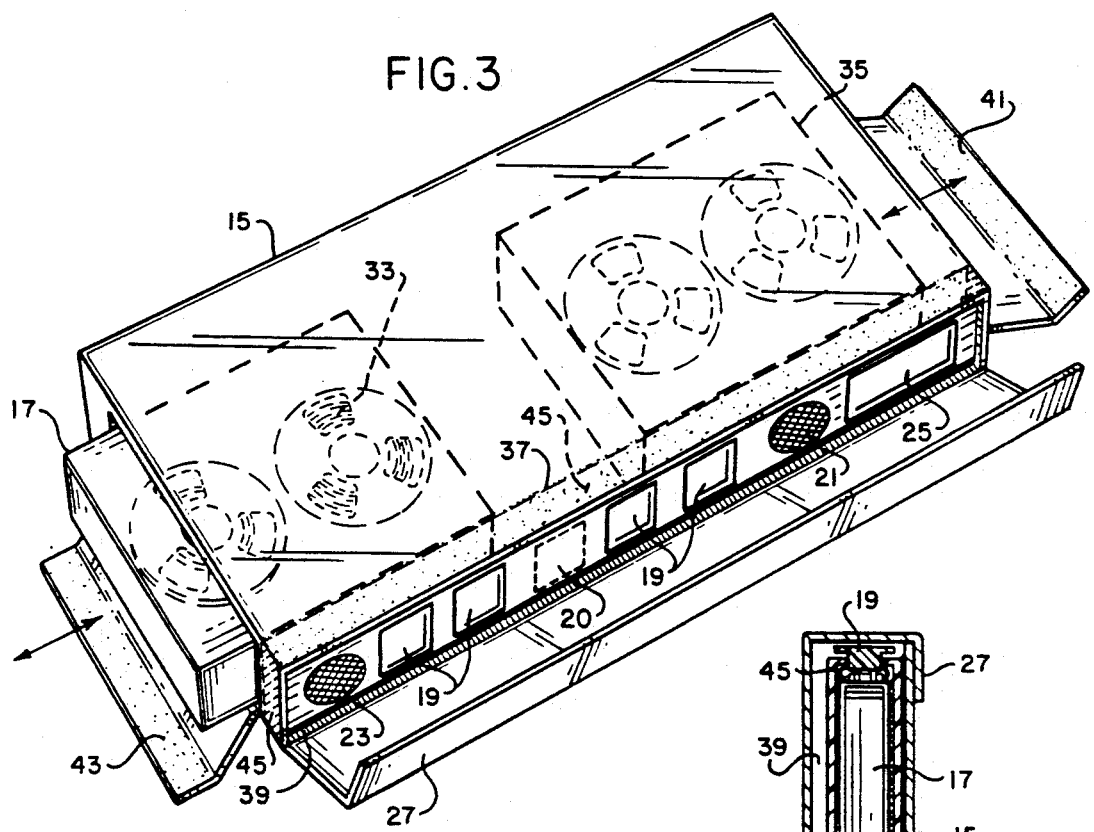
FIG. 3, a second embodiment, is an isometric rear view of a small tape recorder device with duplicate, removable audiotape cassettes, and side access flaps, encased and configured as a mailer.

Referring to FIG. 3, in this second embodiment the sender removes one of the duplicate audiotape cassettes 17, 35 by opening one of the side access adhesive flaps 41, 43 and pressing an eject button (or optionally, a stop/eject button), an area for which is shown 20.

Referring again to FIG. 1, after recording and cuing a message, the sender addresses the mailer and affixes postage in the designated areas 29, 31.

Figure 5:
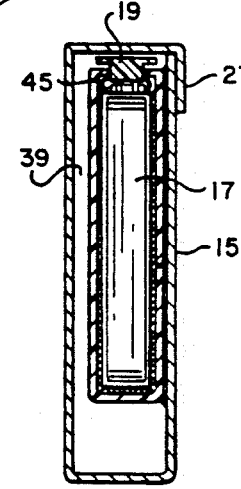
FIG. 5 is a cross-sectional view of FIG. 4 shown along line 5.

Referring to FIG. 5, the sender may optionally insert an enclosure such as a letter, document, photograph or other indicia, in the indicated crevice space 39.

Figure 4:
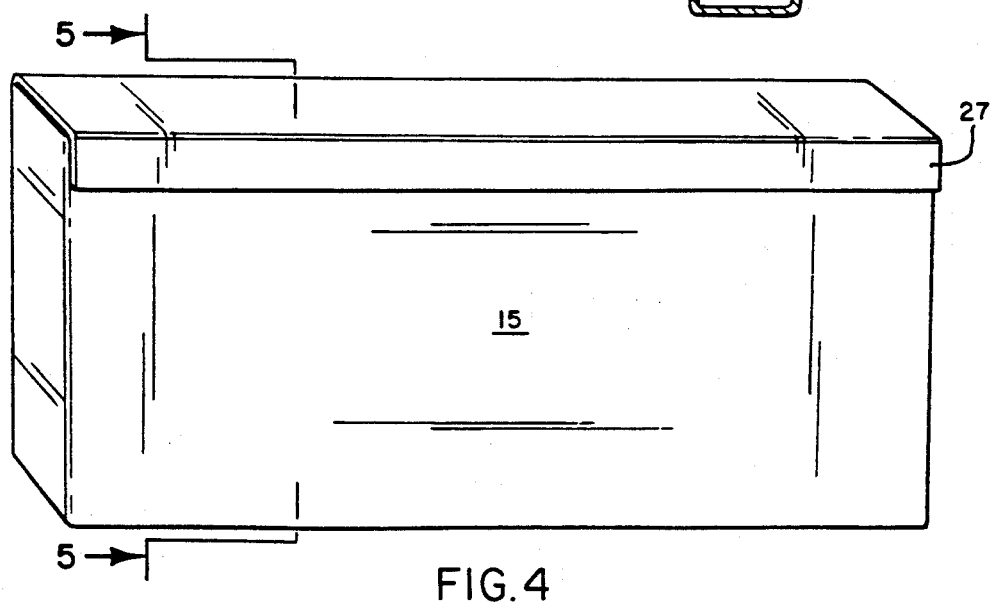
FIG. 4 is a perspective rear view of a small tape recorder device encased and configured as a mailer, with flap sealed.

Referring to FIGS. 3 and 4, when ready for transit, the sender seals the mailer by sealing the casing flap 27 to the adhesive area 37 at the rear of the cardboard casing.

While the audio letter is shown and detailed in a preferred embodiment, variations in embodying the invention may be practiced. For example, a sound recording and reproducing device other than a tape recorder, and a storage medium means other than audiotape, such as computer microchip-based sound wording and reproducing technology, may be employed. Additional variations include: a removable audiotape cassette or microchip storage medium means, accessed by an adhesive side flap (or otherwise); duplicate, removable audiotape cassettes FIG. 3, 17, 35 or microchip storage medium means in which recorded sound is simultaneously stored, accessed by an adhesive side flaps FIG. 3, 41, 43 (or otherwise), enabling a sender to retain a duplicate "copy" of his audio message for future reference; a tape recorder with audiotape not contained in a cassette; a tape recorder other than of small size or type; standard control means or components (such as microphone, speaker or battery) positioned other than at the opening of the casing; electronic-or computer integrated circuitry positioned other than below the control buttons at the opening of the casing; consolidated instrumentation wherein a speaker and microphone are configured "in one," such that the same component functions as a microphone when the device is recording and a speaker when the device is playing; where the speaker is not positioned at the opening of the casing, a casing with perforated holes covering the speaker to allow sound to escape; an embodiment with no crevice space for an enclosure; a casing of durable lightweight material other than durable cardboard; a means of sealing the mailer other than an adhesive flap or flaps. These and other modifications of and departures from the specific preferred embodiment described herein may be made without departing from the inventive concept and the spirit and scope of the appended claims. The invention is therefor not to be limited except as set forth in the claims which follow and within the doctrine of equivalents.

What is claimed is:

1. An apparatus for conveying through mail or alternate postal-type carriers, voice or other sound information, comprising:
    (a) a durable casing configured rectangularly as a mailer, having first and second side walls with exterior space for placing an address and affixing postage, said side walls being of substantially equal size and being joined to one another along three perimetrical edges;
    (b) a recording/reproducing means for recording and reproducing the voice or other sound information, said recording/reproducing means being fully and non-removably enclosed in said casing, and being secured to one of said first and second side walls of said casing;
    (c) a storage medium means for storing the voice or other sound information operatively cooperating with said recording/reproducing means, in which sound information recorded by said recording/reproducing means is stored, which sound information may then be reproduced by said recording/reproducing means;
    (d) a crevice space adapted to receive indicia, said crevice space being situated in between said recording/reproducing means and the other of said first and second side walls of said casing; and
    (e) means for sealing the apparatus for conveyance, including a sealing flap on said casing integral with one of said first and second side walls which extends and folds over an interior portion of the apparatus to overlie a securing area on the other of said first and second side walls of said casing, with adhesive between the flap and the securing area, to form said means for sealing the apparatus.

2. An apparatus as defined in claim 1 wherein said storage medium means is removable.

3. An apparatus as defined in claim 2 wherein the apparatus further includes means for accessing said storage medium means, wherein said accessing means is an adhesive side flap.

4. An apparatus as defined in claim 2 wherein the apparatus further includes a duplicate storage medium means for storing the voice or other sound information simultaneously; said duplicate storage medium means being removable.

5. An apparatus as defined in claim 4 wherein the apparatus further includes means for accessing said duplicate storage medium means, wherein said accessing means are adhesive side flaps.

6. An apparatus as defined in claim 1 wherein said recording/reproducing means includes standard control means for recording and playing back sound information, a microphone and a speaker, and said control means, microphone and speaker are positioned directly under said sealing flap and are fully concealed when the apparatus is sealed.

7. An apparatus as defined in claim 6 wherein said recording/reproducing means includes integrated circuitry and said integrated circuitry is positioned directly under said control means, microphone and speaker.

8. An apparatus as defined in claim 1 wherein said recording/reproducing means includes a consolidated speaker and microphone component and said consolidated speaker and microphone component functions as a microphone when said recording/reproducing means is recording, and as a speaker when said recording/reproducing means is playing.

9. An apparatus as defined in claim 1 wherein said recording/reproducing means includes a speaker situated directly under one of said first and second side walls, and said one of said first and second side walls has perforated holes covering said speaker.

10. An apparatus as defined in claim 1 wherein said durable casing is made of durable cardboard.

11. An apparatus as defined in claim 1 wherein said recording/reproducing means is an audiotape recording/reproducing means and said storage medium means is an audiotape.

12. An apparatus as defined in claim 11 wherein said audiotape is contained in a cassette.

13. An apparatus as defined in claim 12 wherein said cassette is of "microcassette" size.

14. An apparatus as defined in claim 1 wherein said recording/reproducing means is a computer microchip recording/reproducing means and said storage medium means are microchips.

15. An apparatus as defined in claim 1 wherein the apparatus is approximately $3\frac{1}{2}''$ (width)$\times 7\frac{1}{2}''$ (length)$\times \frac{3}{4}''$ (depth) in dimension and weighs approximately 6 ounces.

16. An apparatus for conveying through mail or alternate postal-type carriers, voice or other sound information, comprising:

(a) a durable casing configured rectangularly as a mailer, having first and second side walls with exterior space for placing an address and affixing postage, said side walls being of substantially equal size and being joined to one another along three perimetrical edges;

(b) an audiotape recording/reproducing means for recording and reproducing the voice or other sound information, said audiotape recording/reproducing means being fully and non-removably enclosed in said casing, and being secured to one of said first and second side walls of said casing;

(c) an audiotape storage medium means for storing the voice or other sound information operatively cooperating with said audiotape recording/reproducing means, in which sound information recorded by said audiotape recording/reproducing means is stored, which sound information may then be reproduced by said audiotape recording/reproducing means;

(d) a crevice space adapted to receive indicia, said crevice space being situated in between said audiotape recording/reproducing means and the other of said first and second side walls of said casing; and (e) means for sealing the apparatus for conveyance, including a sealing flap on said casing integral with one of said first and second side walls which extends and folds over an interior portion of the apparatus to overlie a securing area on the other of said first and second side walls of said casing, with adhesive between the flap and the securing area, to form said means for sealing the apparatus.

17. An apparatus as defined in claim 16 wherein said audiotape recording/reproducing means accommodates differing amounts of said audiotape storage medium means.

18. An apparatus as defined in claim 16 wherein said audiotape storage medium means is contained in a cassette.

19. An apparatus as defined in claim 18 wherein said cassette is of "microcassette" size.

20. An apparatus as defined in claim 18 wherein said cassette is removable.

21. An apparatus as defined in claim 20 wherein the apparatus further includes means for accessing said cassette wherein said accessing means is an adhesive side flap.

22. An apparatus as defined in claim 20 wherein the apparatus further includes a duplicate audiotape storage medium means for storing the voice or other sound information simultaneously; said duplicate audiotape storage medium means is contained in a removable cassette.

23. An apparatus as defined in claim 22 wherein the apparatus further includes means for accessing said cassettes containing said audiotape storage medium means and said duplicate audiotape storage medium means, said acessing means being adhesive side flaps.

24. An apparatus as defined in claim 16 wherein said audiotape recording/reproducing means includes standard control means for recording and playing back sound information, a microphone and a speaker, and said control means, microphone and speaker are positioned directly under said sealing flap and are fully concealed when the apparatus is sealed.

25. An apparatus as defined in claim 24 wherein said audiotape recording/reproducing means includes integrated circuitry and said integrated circuitry is positioned directly under said control means, microphone and speaker.

26. An apparatus as defined in claim 16 wherein said audiotape recording/reproducing means includes a consolidated speaker and microphone component and said consolidated speaker and microphone component functions as a microphone when said audiotape recording/reproducing means is recording, and as a speaker when said audiotape recording/reproducing means is playing.

27. An apparatus as defined in claim 16 wherein said audiotape recording/reproducing means includes a speaker situated directly under one of said first and second side walls, and said one of said first and second side walls has perforated holes covering said speaker.

28. An apparatus as defined in claim 16 wherein said durable casing is made of durable cardboard.

29. An apparatus as defined in claim 16 wherein the apparatus is approximately $3\frac{1}{2}''$ (width)$\times 7\frac{1}{2}''$ (length)$\times \frac{3}{4}''$ (depth) in dimension and weighs approximately 6 ounces.

30. An apparatus for conveying through mail or alternate postal-type carriers, voice or other sound information, comprising:

(a) a durable casing configured rectangularly as a mailer, having first and second side walls with exterior space for placing an address and affixing postage, said side walls being of substantially equal size and being joined to one another along three perimetrical edges;

(b) a recording/reproducing means for recording and reproducing the voice or other sound information, said recording/reproducing means being fully and non-removably enclosed in said casing, and being secured to an interior of said casing;

(c) a storage medium means for storing the voice or other sound information operatively cooperating with said recording/reproducing means, in which sound information recorded by said recording/reproducing means is stored, which sound information may then be reproduced by said recording/reproducing means;

(d) means for sealing the apparatus for conveyance, including a sealing flap on said casing integral with one of said first and second side walls which extends and folds over an interior portion of the apparatus to overlie a securing area on the other of said first and second side walls of said casing, with adhesive between the flap and the securing area, to form said means for sealing the apparatus.

* * * * *